(12) United States Patent
Morimoto et al.

(10) Patent No.: US 6,345,216 B1
(45) Date of Patent: Feb. 5, 2002

(54) MOTOR CONTROL APPARATUS FOR VEHICLE

(75) Inventors: Kazuhiko Morimoto; Yoshiaki Omata, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/696,164

(22) Filed: Oct. 25, 2000

(30) Foreign Application Priority Data

Oct. 26, 1999 (JP) .......................................... 11-303315

(51) Int. Cl.⁷ ................................................ B06K 1/02
(52) U.S. Cl. ........................... 701/22; 701/53; 180/337; 477/7; 477/13; 477/62
(58) Field of Search ........................ 701/22, 53; 477/7, 477/8, 13, 15, 20, 34, 62, 70, 77, 79, 87, 166; 180/337

(56) References Cited

U.S. PATENT DOCUMENTS

| | | | |
|---|---|---|---|
| 4,371,050 A | * 2/1983 | Ikeura | 180/271 |
| 4,377,995 A | * 3/1983 | Fiala | 123/361 |
| 4,455,983 A | * 6/1984 | Fiala | 123/399 |
| 4,598,679 A | * 7/1986 | Ohkumo et al. | 123/325 |
| 4,750,598 A | * 6/1988 | Danno et al. | 477/110 |
| 5,839,533 A | 11/1998 | Mikami et al. | |
| 5,841,201 A | 11/1998 | Tabata et al. | |
| 5,895,333 A | 4/1999 | Morisawa et al. | |
| 5,935,040 A | 8/1999 | Tabata et al. | |
| 6,185,996 B1 | * 2/2001 | He et al. | 73/117.3 |
| 6,234,932 B1 | * 5/2001 | Kuroda et al. | 477/3 |

FOREIGN PATENT DOCUMENTS

| | | |
|---|---|---|
| JP | 5-39750 | 2/1993 |
| JP | 5-322032 | 12/1993 |
| JP | 9-74602 | 3/1997 |
| JP | 10-220266 | 8/1998 |

* cited by examiner

Primary Examiner—William A. Cuchlinski, Jr.
Assistant Examiner—Olga Hernandez
(74) Attorney, Agent, or Firm—Flynn, Thiel, Boutell & Tanis, P.C.

(57) ABSTRACT

A motor control apparatus for a vehicle, including a vehicle velocity sensor; an engine rotational speed sensor; a first clutch switch which becomes off when a clutch is fully engaged, and successively from the fully engaged state becomes on just before the clutch is placed in a partially engaged state; a second clutch switch which becomes off when a clutch is fully released, and successively from the fully released state becomes on just before the clutch is placed in a partially engaged state; and a motor control device for controlling so as to generate electricity by the motor, determining as the approval of the idling power-generating control state, when at least one of the following two conditions is satisfied: the condition that a vehicle velocity is zero and an engine rotational speed exceeds zero, and the condition that a vehicle velocity is zero and the second clutch switch is off. The motor control apparatus can control the motor by determining an approval of the various motor control state using the neutral determination of the transmission, without using a mechanical gear position sensor.

2 Claims, 11 Drawing Sheets

① DRIVE/POWER GENERATION PERMITTED: DRIVE/POWER GENERATION CONTROL

② DRIVE PROHIBITED (POWER GENERATION PERMITTED): POWER GENERATION CONTROL (VEHICLE RUNNING)

③ DRIVE/POWER GENERATION PROHIBITED: MOTOR CONTROL PROHIBITED

④ IDLING: POWER GENERATION CONTROL

⑤ SPECIAL CASE 1 (VEHICLE STARTING STATE): DRIVING CONTROL

⑥ SPECIAL CASE 2 (ENGINE STARTING STATE): DRIVING CONTROL (VEHICLE STATIONARY)

⑦ SPECIAL CASE 3 (IDLING STABILIZING CONTROL STATE): DRIVING CONTROL

MOTOR CONTROL APPARATUS FOR VEHICLE

CROSS REFERENCE TO RELATED APPLICATIONS

This application is related to copending applications Ser. No. 09/672,631 (Atty. Ref.: Saigoh Case 266), Ser. No. 09/672,634 (Atty. Ref.: Saigoh Case 267) and Ser. No. 09/672,633 (Atty. Ref.: Saigoh Case 268), all titled "MOTOR CONTROL APPARATUS COMBINED TO ENGINE" and filed Sep. 28, 2000. The disclosures of the related applications are, in their entirety, incorporated herein by reference.

FIELD OF THE INVENTION

This invention relates to a motor control apparatus for a vehicle having a transmission connected to an engine through a clutch.

BACKGROUND OF THE INVENTION

Some motor vehicles are of a type commonly called a hybrid vehicle having an internal combustion engine and an electric motor disposed therein as the power sources of the vehicle propulsion system. In such vehicle, there is a motor control apparatus for directly connecting a motor having both driving and power-generating functions to the engine, and for controlling the driving and the power-generating states of this motor in control states during stop and traveling set on the basis of a traveling state of the vehicle and a running state of the vehicle engine. The motor control apparatus of the vehicle lets a determination of control of the motor reflect a gear position of the transmission. The gear position of the transmission is detected by a gear position sensor, and the gear position sensor detects whether a certain gearing gear is engaged with a gear position, and whether a gear position is neutral so that all of the gearing gears are not engaged.

One such example of a motor control apparatus which lets a control reflect a gear position of the transmission is disclosed is published Japanese Applications Laid-Open No. 5-322032, No. 5-39750 and No. 10-220266.

The motor control apparatus indicated in published Japanese Application Laid-Open No. 5-322032 detects a change of the vehicle clutch by a clutch switch, and infers a gear position of the transmission from vehicle velocity and engine rotational speed. Thereby, the motor control apparatus measures gearing frequency from a change of the gear position and on the basis of these results, the motor control apparatus distinguishes a trouble of a clutch switch from matching with the gearing frequency and the change frequency of a clutch switch.

The motor control apparatus indicated in published Japanese Application Laid-Open No. 5-39750 controls the air-fuel ratio by opening and closing a flow quality control valve of an air-bleed passage of a vaporizer, from a traveling/stopping condition distinction which is executed by both signals of a neutral switch and a clutch switch or a vehicle velocity switch.

In the motor control apparatus indicated in published Japanese Application Laid-Open No. 10-220266, when a neutral switch becomes off after a neutral position of the transmission is removed, then a determination is made as to whether the engine power may be boosted on the basis of the engine rotational speed. When judgment to boost the engine power is approved, then the engine power may be boosted by doing a valve-opened degree correction of an ISC valve, and the apparatus controls a valve-opened degree correction value of the ISC valve so as to become small as the vehicle velocity rises.

Also, a usual motor control apparatus for a vehicle letting a control of a motor reflect a gear position of the transmission requires a gear position sensor, and detects whether a certain gearing gear is engaged with a gear position, and whether a gear position is neutral in that all of gearing gears are not engaged.

The motor control apparatus controls a motor by a gear position detected by a gear position sensor, set as a determining condition for approving various motor control states. For example, when an idle power generating control state is approved in stopping, the motor control apparatus controls so as to generate electricity by the motor, and when a drive/power generation prohibiting control state is approved in traveling, and the motor control apparatus controls so as to prohibit a drive/power generation of the motor.

However, when the gear position sensor for detecting a gear position of the transmission is disposed in a motor control apparatus, the structure of the motor control apparatus is complicated, and there is an undesired rise in cost. Moreover, as the gear position sensor detects a gear position the transmission mechanically, there are situations where gear position is detected improperly, and an error signal is output, and for this reason reliability deteriorates.

In order to obviate or at least minimize the above inconvenience, the present invention provides a motor control apparatus for a vehicle having an engine mounted in the vehicle which connects to a transmission through a clutch, and a motor disposed therein, the motor having both driving and power-generating functions. The control apparatus controls both driving and power-generating states of the motor on the basis of a traveling state of the vehicle and a running state of the engine, and includes: a vehicle velocity sensor for detecing a vehicle velocity of the vehicle; an engine rotational speed sensor for detecting an engine rotational speed of the engine; a first clutch switch which becomes off when the clutch is fully engaged, and successively from the fully engaged state, becomes on just before the clutch is placed in a half combination (partially engaged) state; a second clutch switch which becomes off when the clutch is fully released, and successively from the fully released state, which becomes on just before the clutch is placed in a half combination (partially engaged) state; and a motor control means for controlling so as to generate electricity by the motor, determining as the approval of an idling power-generating control state, when at least one of the following two conditions is satisfied: the condition that a vehicle velocity is zero and an engine rotational speed exceeds zero, and the condition that a vehicle velocity is zero and the second clutch switch is off.

In the motor control apparatus for a vehicle in this invention, the motor control means controls so as to generate electricity by the motor, determining as the approval of an idling power-generating control state, when at least one of the following two conditions is satisified: the condition that vehicle velocity is zero and the engine rotational speed exceeds zero; and the condition that vehicle velocity is zero and the second clutch switch is off. Thereby, without requiring a gear position sensor, the motor control means can determine that a gear position of a transmission is neutral; and then can determine the control state of the motor based on the neutral position determination of the transmission.

DETAILED DESCRIPTION

An explanation will now be given of embodiments of the invention with reference to the drawings. FIGS. 1–12 show first embodiments according to the invention. In FIG. 5, reference numeral 2 denotes an internal combustion engine mounted on a vehicle (not shown) such as an automobile; 4 a clutch; and 6 a manually operated transmission. The transmission 6 is directly connected to the engine 2 through the clutch 4. The transmission 6 includes gearing gears for more than one speed, for example, gearing gears for a five-speed system (not shown), such being conventional and well known.

Figure 6:
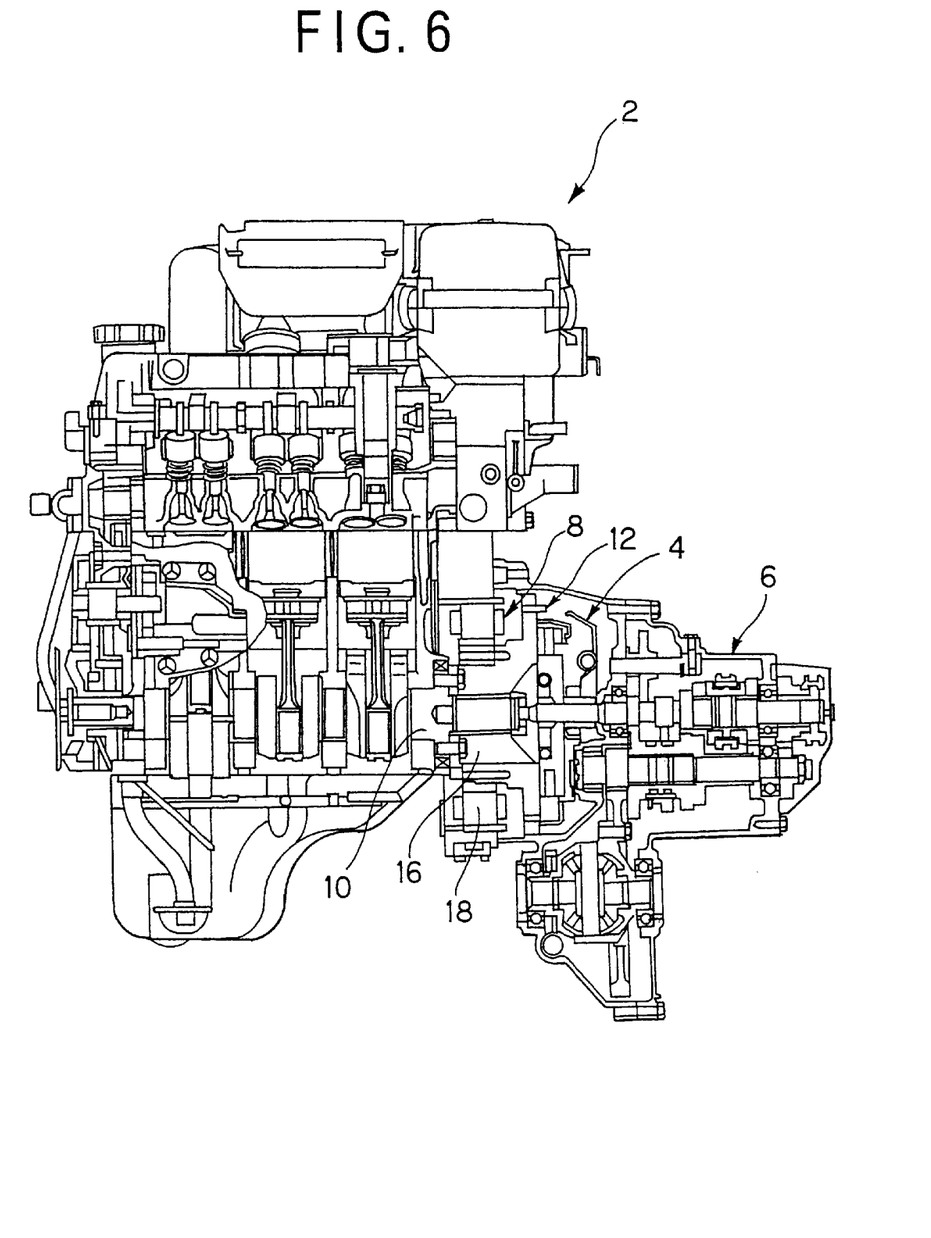
FIG. 6 is a sectional view of an engine directly connected with a motor on a flywheel side thereof.
Figure 7:
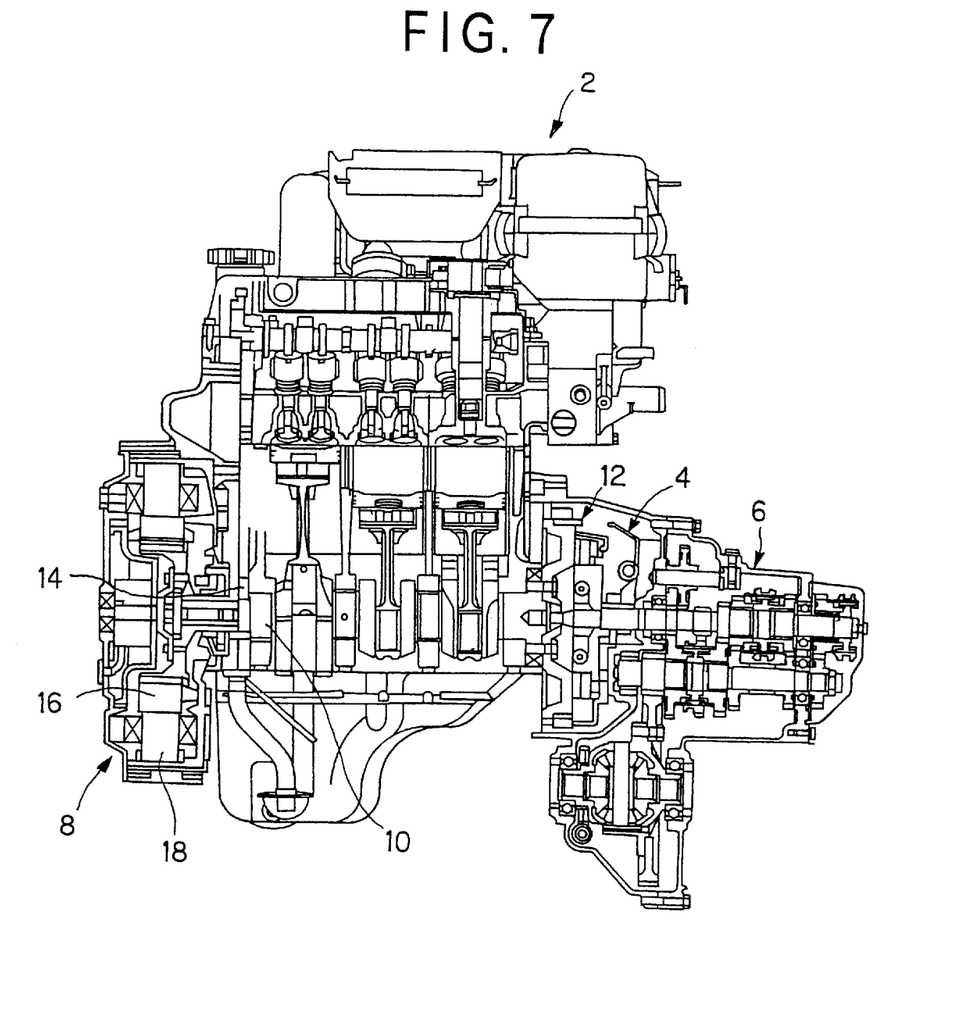
FIG. 7 is a sectional view of an engine directly connected with a motor on a crank sprocket side thereof.

An electric motor 8 having a driving function and a power generating function is directly connected to the engine 2. The motor 8, as shown in FIG. 6, is directly connected to a side of a flywheel 12 which connects to a crank shaft 10 of the engine 2. Alternately, the motor, as shown in FIG. 7, may be directly connected to a side of a crank sprocket 14 which connects to the crank shaft 10 of the engine 2. The motor 8 has a rotor 16 and a stator coil 18.

The engine 2 includes an alternator 20, an air-compressor 22 for air-conditioner, a starter 24 for starting up the vehicle, a sub-radiator fan 28 of a sub-radiator 26 for cooling the motor 8, and an electrically-driven water pump 30. The alternator 20 and the air compressor 22 are conventionally connected to the crank shaft 10 by pulleys and belts (not shown). The starter 22 is conventionally connected to the flywheel 12 by an engageable and disengageable pinion and ring gear (not shown).

The operating state of the engine 2 is controlled by engine control means 32. The driving state and a power generating state of the motor 8 is controlled by a motor control means 36 of a motor controller 34.

As shown in FIG. 5, the engine 2 is linked to the engine control means 32 by a bi-directional signal line 38 for engine control. The engine control means 32 is linked to a sub-battery 42 by a power line 40. The sub-battery 42 is linked to the alternator 20 by a charging power line 44, and is linked to the starter 24, the sub-radiator fan 28 and the electrically-driven water pump 30 by a driving power line 46. The sub-battery 42 is charged by the alternator 20, and supplies a drive electric power to the starter 22, the sub-radiator fan 28 and the electrically-driven water pump 30.

The motor 8 is linked to the motor control means 36 by a signal line 48. The motor control means 36 is linked to the sub-battery 42 by a power line 50, and is linked to a main battery 54 by a power line 52. The main battery 54 supplies drive electric power to the motor 8, and is charged by electric power generated by the motor 8.

Figure 8:
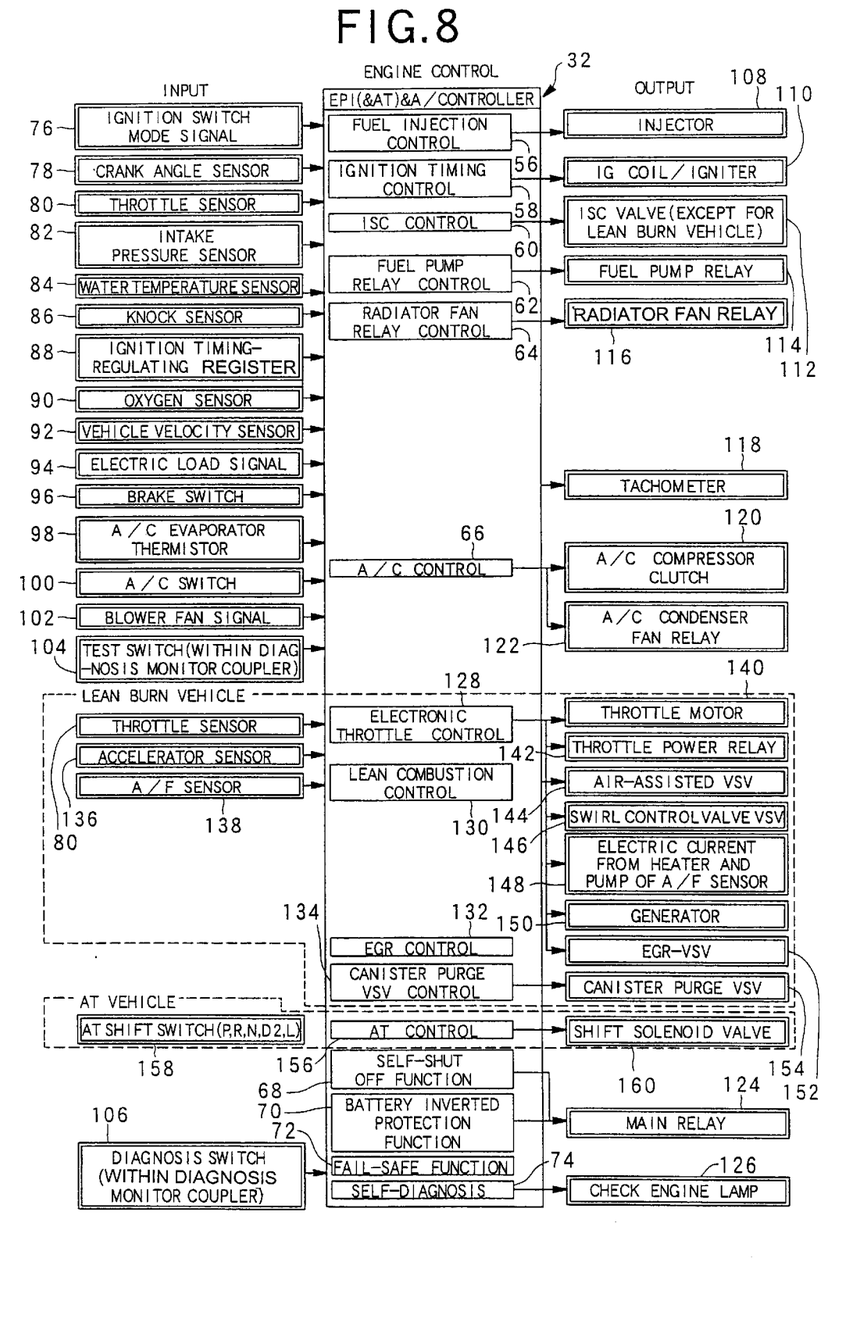
FIG. 8 is a diagram of the engine control means.

The engine control means 32, as shown in FIG. 8, includes a fuel injection control unit 56, an ignition timing control unit 58, an idle speed control (ISC) unit 60, a fuel pump relay control unit 62, a radiator fan relay control unit 64, an air conditioner (A/C) control unit 66, a self shutoff function unit 68, a sub-battery inverse contact (polarity) protection function unit 70, a failsafe function unit 72 and a self diagnosis unit 74.

The engine control means 32, is linked at the input side to: an ignition switch 76; a crank angle sensor 78; a throttle sensor 80; an intake pressure sensor 82; a water temperature sensor 84; an engine knock sensor 86; an ignition timing adjusting register 88; an 02 sensor 90; a vehicle velocity sensor 92; an electric load sensor 94; a brake switch 96; an A/C evaporator thermistor 98; an A/C switch 100; a blower fan 102; a test switch 104; and a diagnosis switch 106.

Further, the engine control means 32 is linked at the output side to: an injection 108; an ignition coil/ignitor 110; an ISC valve 112; a fuel pump relay 114; a radiator fan relay 116; a tachometer 118; and A/C compressor clutch 120; and A/C condenser fan relay 122; a main relay 124; and a check engine lamp 126.

Further, the engine control means 32 includes an electronic throttle control unit 128, a lean burn control unit 130, an exhaust gas recirculation (EGR) control unit 132 and a canister purge valve control unit 134, enclosed by a broken line in FIG. 8, when the engine is lean burn (lean combustion). In this case, the engine control means 32 is linked at the input side to: an accelerator sensor 136 and an air/fuel (A/F) sensor 138 in addition to the throttle sensor 80. And, the engine control means 32 is linked at the output side to: a throttle motor 140; a throttle power relay 142; an air assist valve 144; a swirl control valve 146; an A/F sensor heater and pump 148; a generator 150; an EGR valve 152; and a canister purge valve 154.

Further, the engine control means 32 includes an AT control unit 156 as shown by broken lines in FIG. 8 when the transmission 6 is an automatic transmission. In this case, the engine control means 32 is linked at the input side to an AT shift switch 158, and at the output side to a shift solenoid valve 160.

The engine control means 32 operates the injector 108 and the ignition coil/ignitor 110 by signals inputted from the crank angle sensor 78 and the throttle sensor 80, and controls a fuel injection amount and an ignition timing of the engine 2 according to the operating state.

Figure 9:
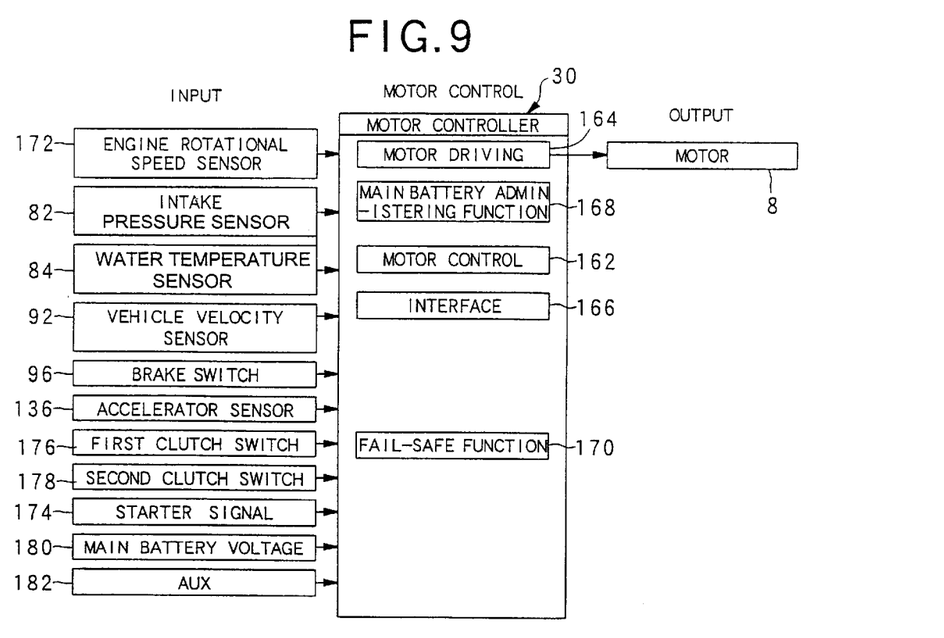
FIG. 9 is a diagram of the motor control means.

The motor control means 36 of the motor drive control apparatus 34 for controlling the motor 8, as shown in FIG. 9, includes a motor control unit 162, a motor drive unit 164, an input/output processing unit (interface) 166, a main battery state control unit 168 and a failsafe unit 170.

The motor control means 36 is linked at the input side to: an engine rotational speed sensor 172; a starter switch 174; a first clutch switch (SWI) 176; a second clutch switch (SW2) 178; a main battery voltage detector 180; and an auxiliary input (AUX) 182 in addition to the intake pressure sensor 82, the water temperature sensor 84, the vehicle velocity sensor 92, the brake switch 96 and the accelerator sensor 136. The motor control means 36 is linked at the output to the motor 8.

Figure 10:
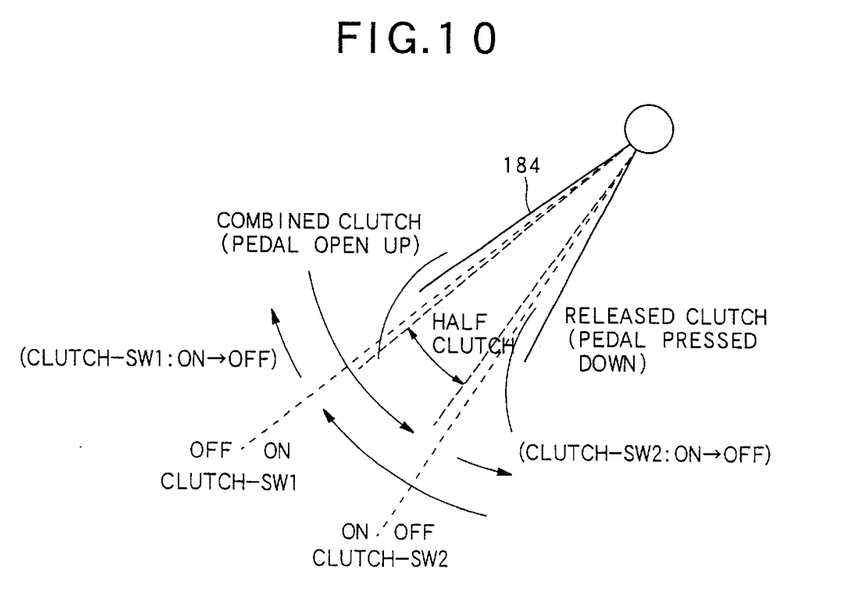
FIG. 10 is a schematic diagram for explaining an ON/OFF condition of first and second clutch switches.

The first clutch switch 176, as shown in FIG. 10, becomes "off" when the clutch pedal 184 is not pressed down so that clutch 4 is fully engaged, furthermore the first clutch switch 176 becomes "on" when the clutch 4 is gradually released from a complete engaged state by pressing down the clutch pedal 184 and just before it is placed in a half combination (i.e. partially engaged) state. And the switch 176 becomes on when the clutch 4 is in a complete release state when the clutch pedal 184 is fully pressed down.

The second clutch switch 178 becomes "off" when the clutch pedal 184 is fully pressed down and clutch 4 is fully released (i.e., fully disengaged), furthermore the second clutch switch 178 becomes "on" just before the clutch pedal 184, during its return from the fully pressed down state, is placed in a partially engaged state. And the clutch 184 becomes on when the clutch 4 is in a complete combination (fully engaged) state when the clutch pedal 184 is fully returned.

Figure 11:
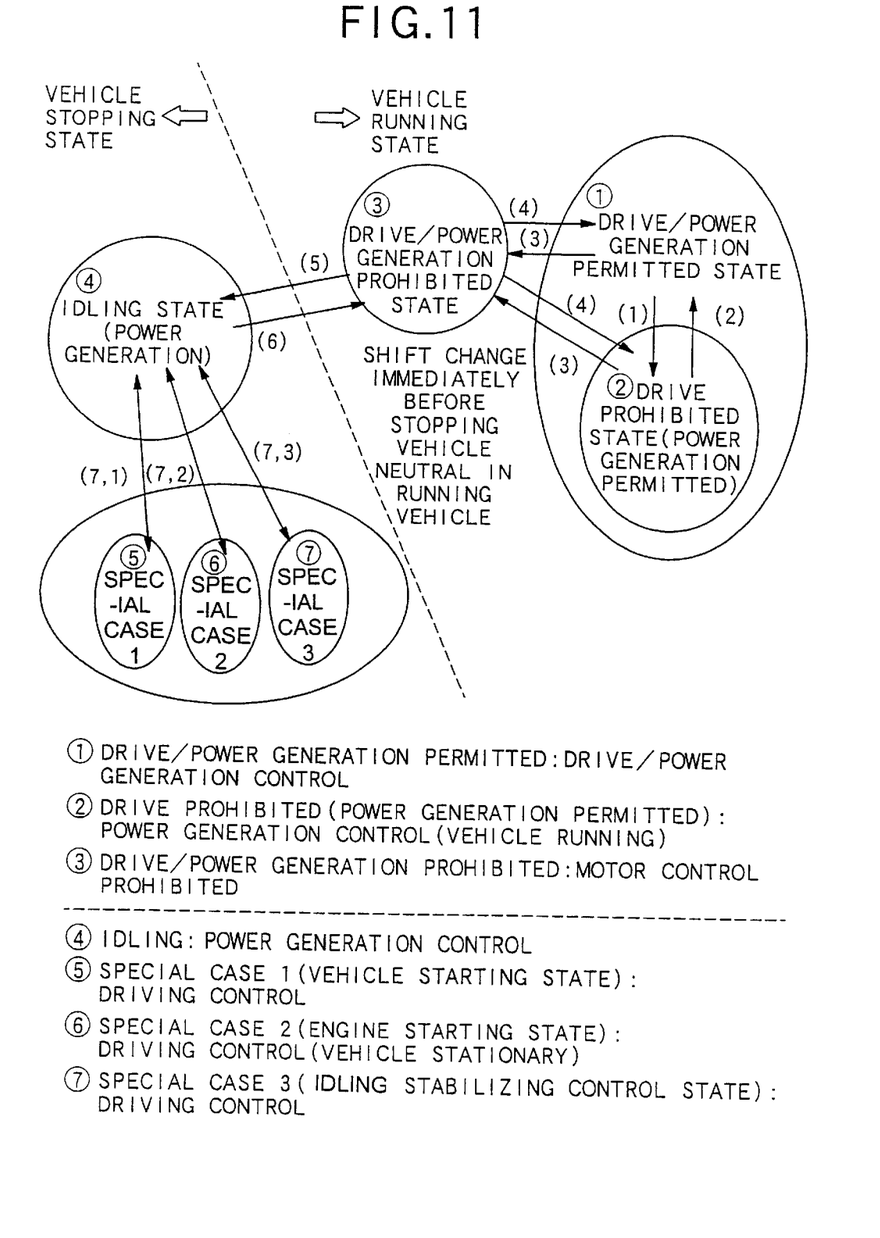
FIG. 11 is a diagram showing transition of control states.

The motor control means 36, as shown in FIG. 11, sets a stop control mode and a running control mode as control modes based on the operating state of the vehicle, and controls by way of a drive/power generation prohibiting control mode for prohibiting drive and power generation of the motor 8 when the motor contol means 36 switches over between a stop control mode and a running control mode.

Figure 12:
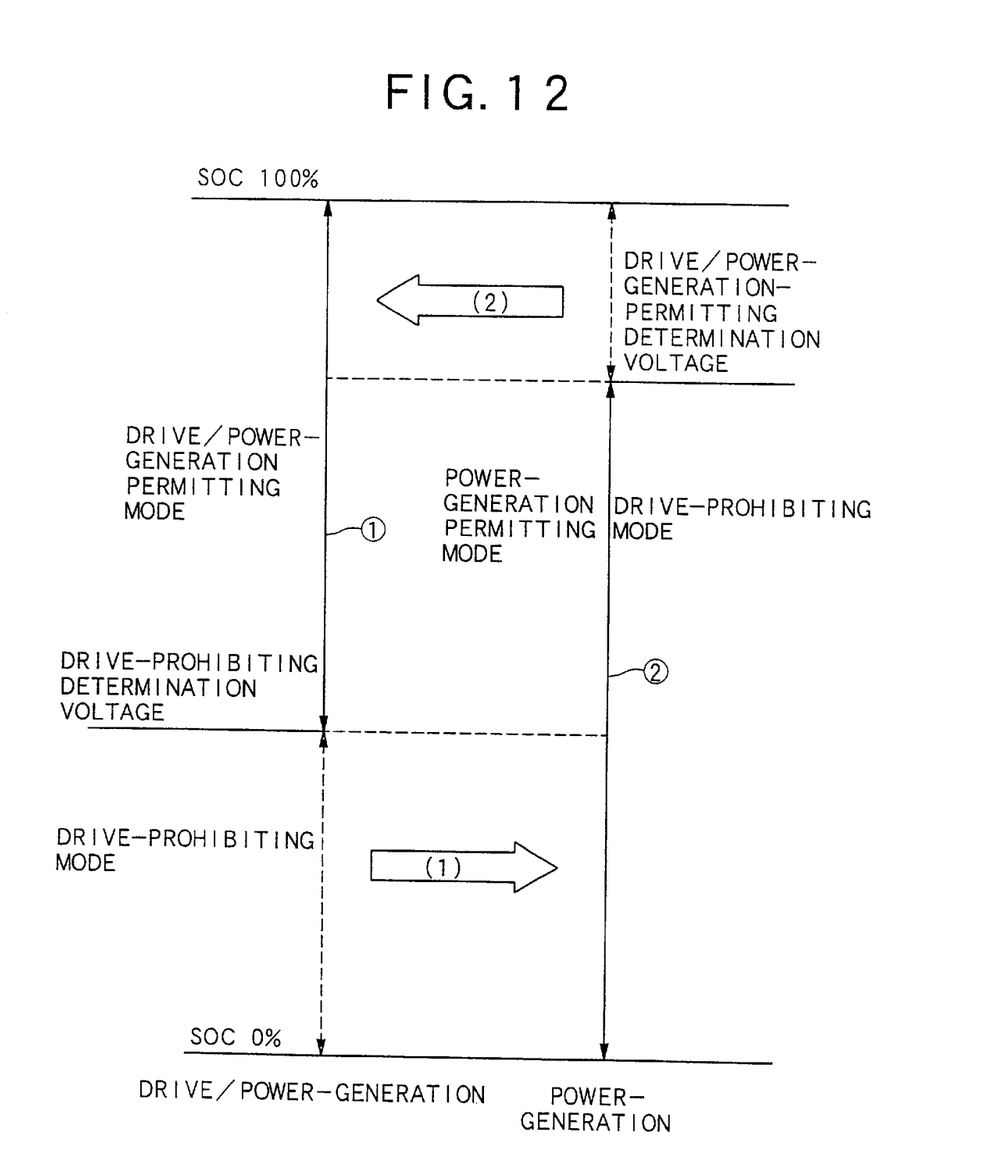
FIG. 12 is a diagram showing transition of control in accordance with voltage of a main battery.

Moreover, the motor control means 36, as shown in FIG. 12, inputs a main battery voltage signal from the main battery voltage detector 180 for detecting a main battery voltage of the main battery 54, and controls so as to administer a main battery state based on the main battery voltage by the main battery state control unit 168.

Further, as shown in FIG. 11, the motor control means 36, as the stop control mode, sets an idling power generating control mode, a starting drive control mode, a starting-up drive control mode and a rotational speed stabilizing drive control mode. And in the idling power generating control mode, the motor control means 36 controls so as to charges the main battery 54 by the motor 8 generating electricity; and in the starting drive control mode, controls so as to assist in starting the vehicle by driving the motor 8; and in the starting-up drive control mode, controls so as to assist the engine 2 in starting up the vehicle by driving the motor 8; and in the rotational speed stabilizing drive control mode, controls so as to stabilize an idling of the engine 2 by driving the motor 8.

Further, the motor control means 36 sets a drive/power-generation permitting control mode, a drive prohibiting control mode and a drive/power-generation prohibiting control mode, as the traveling control mode, and controls so as to permit driving and power generation of the motor 8 in the drive/power generation permitting control mode, so as to prohibit driving of the motor 8 in the drive prohibiting control mode, and so as to prohibit driving and power generation of the motor 8 in the drive/power generation prohibiting control mode.

A switchover between the drive/power generation permitting control mode and the drive prohibiting control mode set as the running control mode, is controlled based on the main battery voltage of the main battery 54 administering by the main battery state control unit 168 of the motor control means 36.

The motor control means 36, as shown in FIG. 12, controls so as to permit driving and power generation of the motor 8 in accordance with the drive/power generation permitting control mode from a 100% charged state (SOC) of the main battery voltage, and when the main battery voltage is less than a lower limit of a drive prohibition determining voltage, then the motor control means 36 switches over to the drive prohibiting control mode. In the drive prohibiting control mode, the motor control means 36 controls so as to prohibit a driving of the motor 8, and controls so as to permit a power generation until the main battery voltage reaches a drive/power generation permission determining voltage, and when the main battery voltage exceeds the drive/power generation permission determining voltage, then the motor control means 36 controls so as to switch over to the drive/power generation permitting control mode and controls so as to permit a driving and a power generation of the motor.

The switchover from the drive/power generation permitting control mode to the drive prohibiting control mode is carried out when a switchover condition which is set by a duration time period of the drive prohibition determining voltage with regard to the main battery voltage is satisfied. The switchover from the drive prohibiting control mode to the drive/power generation permitting control mode is carried out when a switchover condition which is set by a duration time period of the drive/power generating permission determining voltage with regard to the main battery voltage is satisfied.

Figure 2:
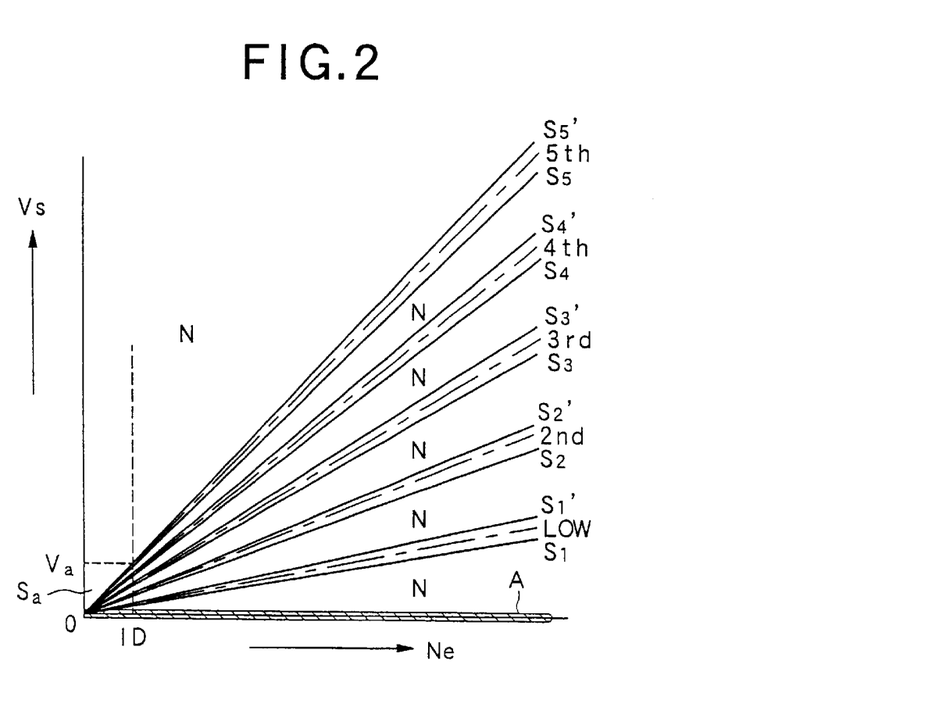
FIG. 2 is a diagram for explaining a region consisting of a vehicle velocity and an engine rotational speed.
Figure 3:
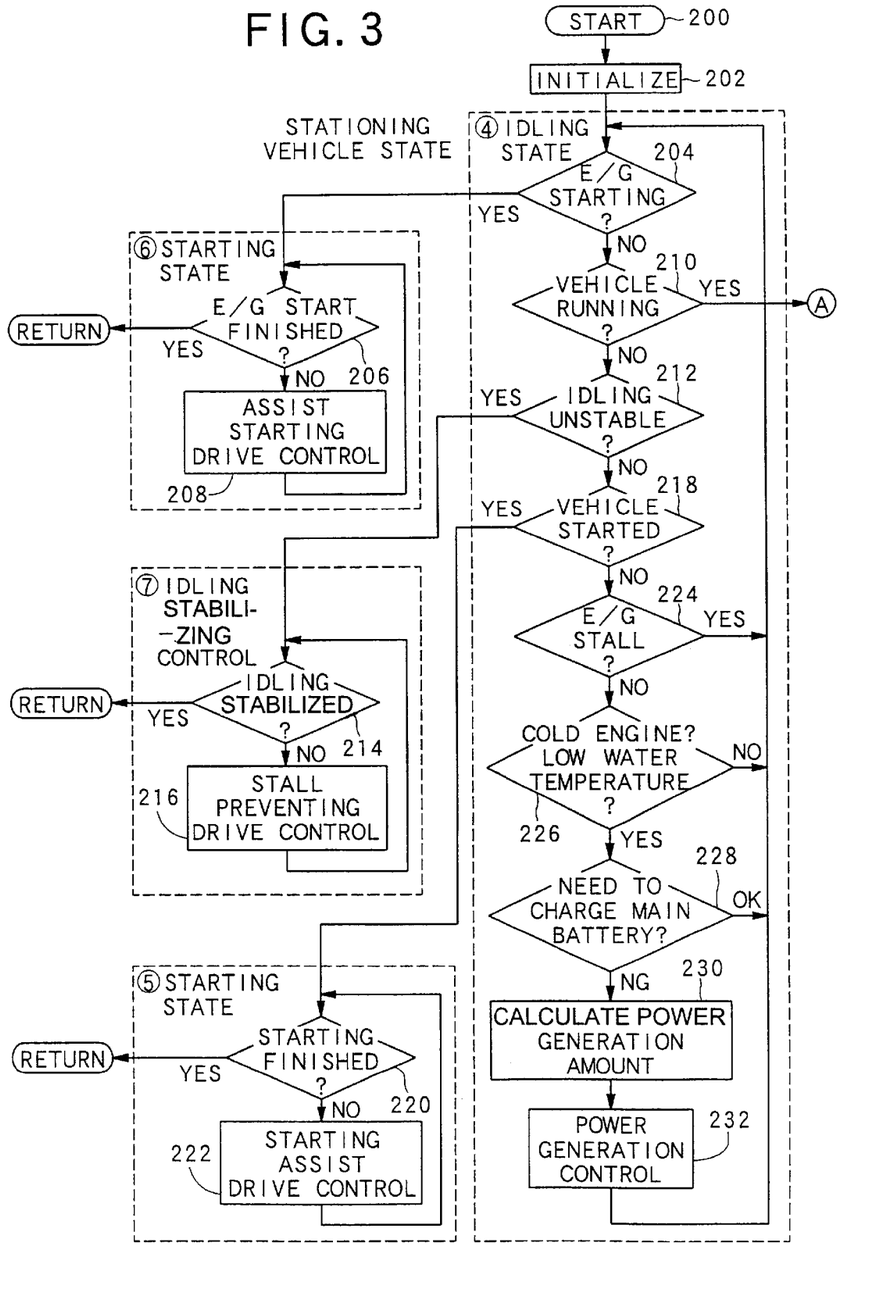
FIG. 3 is a control flowchart of a stationary vehicle control state.

The motor control means 36 controls the motor 8 as shown in flowcharts of FIG. 2 and FIG. 3. Referring to FIG. 3, when the motor control means 36 is in the stopping control mode of the vehicle, it starts control at step 200, then the program is initialized at step 202. Then, a determination in the idling power-generating control mode is made at step 204 as to whether the engine 2 is starting up.

When the determination in step 204 is "YES", then it is determined at step 206 whether the start-up of the engine 2 has been completed. When the determination in step 206 is "YES", then the routine is returned to previous step 204. However, when the answer to the determination in step 206 is "NO", then the motor control means 36 is put into a start-up drive control mode. The motor control means 36 then provides control over the motor 8 at step 208 so as to drive the motor 8 and assist in starting the engine 2. Then, the routine is returned to previous step 206.

When the determination in previous step 204 is "NO", then a determination is made at step 210 as to whether the vehicle is traveling. When the answer to the determination in step 210 is "YES", then the motor control means 38 is shifted to the traveling control mode as hereinafter described. When the determination in step 210 is "NO", then it is determined at step 212 whether an idling rotational speed is unstable.

When the determination in step 212 results in "YES", then it is determined as step 214 whether such idling rotational speed has been stabilized. When the determination in step 214 is "YES", then the routine is returned to previous step 212. However, when the determination in step 214 results in "NO", then the motor control means 36 is put into an idling rotational speed-stabilized drive control mode. The motor control means 36 executes control over the motor 8 at step 216 so as to drive the motor 8 and stabilize idling of the engine 2, and moreover, so as to prevent a stall of the engine 2. Then, the routine is returned to previous step 214.

When the determination in previous step 212 results in "NO", then it is determined at step 218 whether the vehicle has started moving. When the determination in steps 218 is "YES", then a further determination is made at step 220 as to whether such vehicle motion has started. When the determination in step 220 is "YES", then the routine is returned to previous step 218. However when the determination in step 220 results in "NO", then the motor control means 36 is put into a starting motion drive control mode. The motor control means 36 then effects control over the motor 14 at step 222 so as to drive the motor 14 and assist in starting motion of the vehicle. Then, the routine is returned to previous step 220.

When the determination in previous step 218 is "NO", then it is determined at step 224 whether the engine 2 stalled. When the determination in step 224 is "YES", then the routine is returned to previous step 204. When the determination in step 224 is "NO", then a determination is made at step 226 as to whether the engine 2 is in a cold state and water temperature is low.

When the answer to the determination in step 226 is "NO", then the routine is returned to previous step 204. However, when the determination in step 226 results in "YES", then it is determined at step 228 whether the main battery 54 needs to be charged.

When the determination in step 228 results in "OK" because the main battery 54 need not be charged, then the routine is returned to previous step 204. However, when the determination in step 228 is "NG" because the main battery 54 must be charged, then a quantity of generated electric power is calculated at step 230 from the idling power generating control mode. Further, the motor 8 is controlled at step 232 so as to generate power. Then, the routine is returned to previous step 204.

Figure 4:
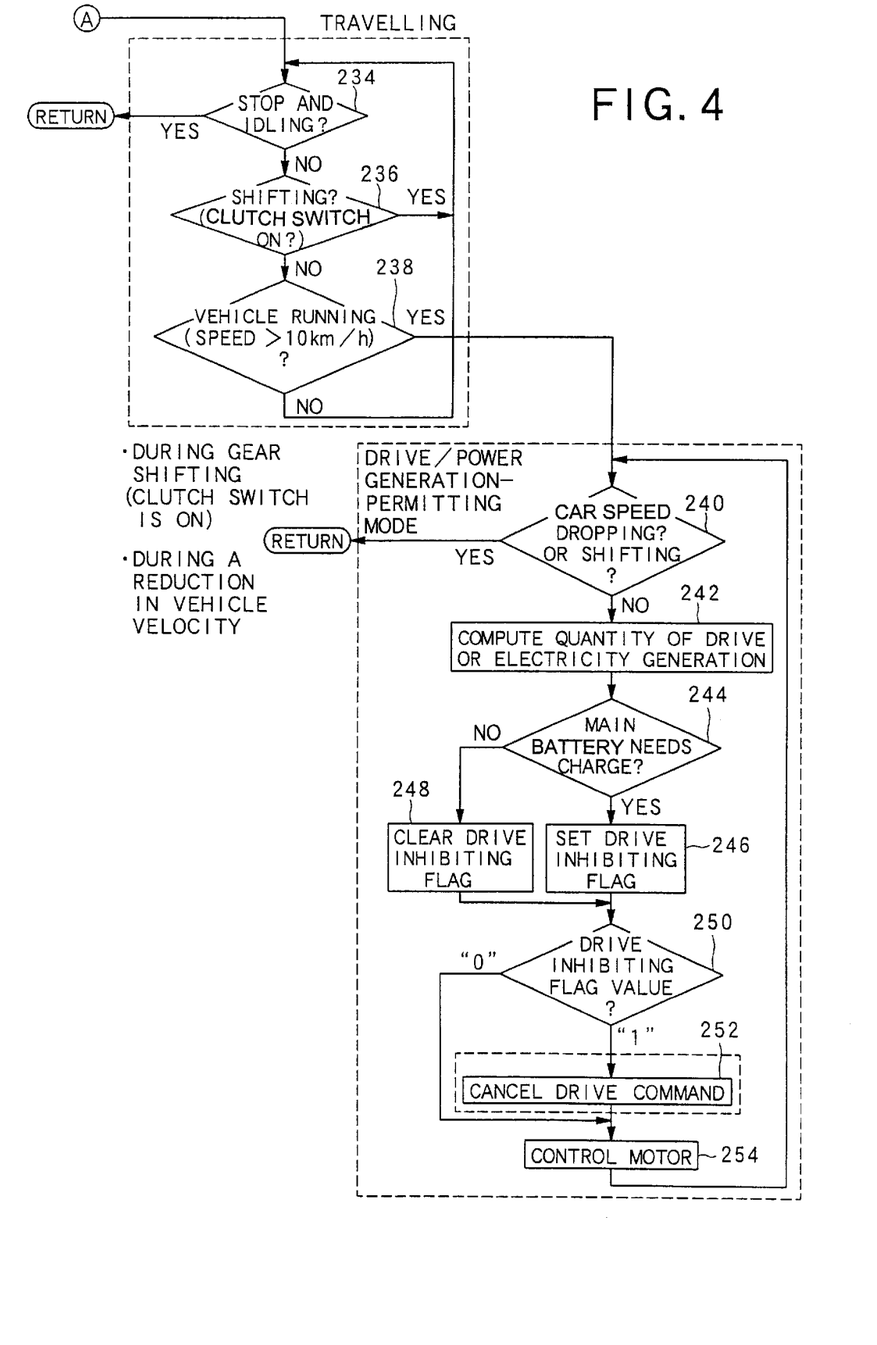
FIG. 4 is a control flowchart of a running vehicle control state.
Figure 5:
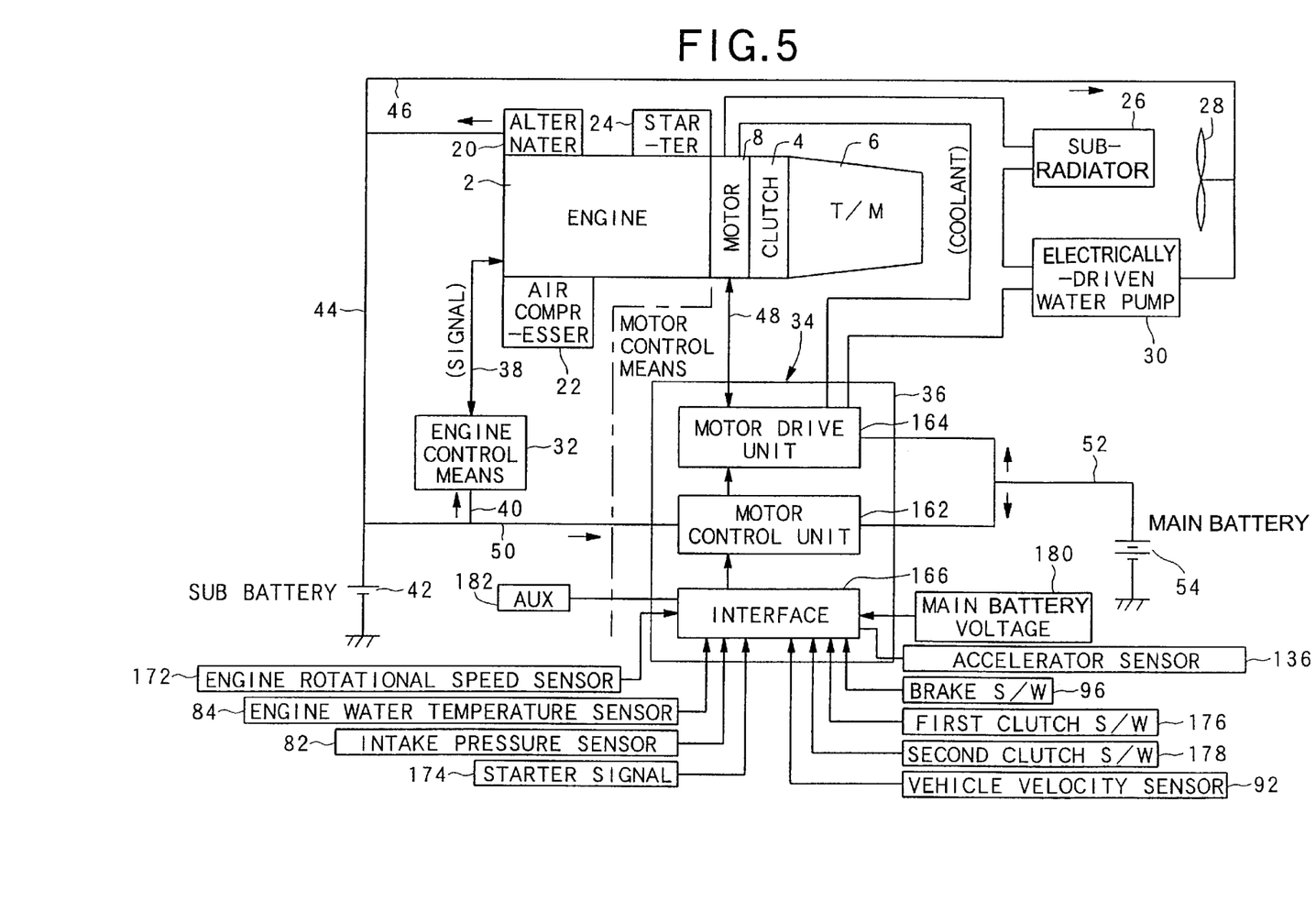
FIG. 5 is a diagram showing a vehicle system including the motor drive control apparatus.

When the determination in step 210 is "YES", because the vehicle is traveling, then the motor control means 36 is at first put into a drive/power generation-prohibiting control mode, and control then shifts to the traveling control mode as shown in FIG. 4.

In the drive/power generation-prohibiting control mode, a determination is made at step 234 as to whether the vehicle is in an idling state after stopped.

When the determination in step 234 is "YES", then the routine is returned to previous step 210 in the idling power generating control mode shown in FIG. 3. When the determination in step 234 is "NO", then it is determined at step 236 whether the first clutch switch 176 is on and the second clutch switch 178 is off (speed changing or in neutral state).

When the determination in step 236 is "YES", then the routine is returned to previous step 234. When the determination in step 234 is "NO", then it is determined at step 238 on the basis of a vehicle velocity signal from the vehicle velocity sensor 92 whether the vehicle is traveling.

When the determination in step 238 is "NO", the routine is returned to previous step 234. However, when the determination in step 238 is "YES", then the motor control means 36 switches over to a drive/power generation-permitting control mode in the traveling control mode.

In the drive/power generation-permitting control mode, a determination is made at step 240 as to whether vehicle velocity is on the decrease or the first clutch switch 176 is on and the second clutch switch 178 is off (speed changing or neutral state).

When the determination in step 240 is "YES", then the routine is returned to previous step 234. When the determination in step 240 results in "NO", then either a driving electrical quantity or a quantity of generated electric power for the motor 8 is calculated at step 242, thereby deciding on either a driving order or a power-generataing order. It is then determined at step 244 whether the main battery 54 needs to be charged.

When the determination in step 244 is "YES" because the battery 40 needs to be charged, then a drive-prohibiting flag is processed at step 246 so as to be set to one value, here a "1". When the determination in step 244 is "NO" because the main battery 40 need not be charged, then the drive-prohibiting flag is processed at step 248 so as to be another value, here cleared to "0".

Successively, it is then determined at step 250 whether the drive-prohibiting flag is either "1" or "0 ".

When the answer to the determination in step 250 is "1", then the motor control means 36 I shifted to a drive-prohibiting control mode. When the result from previous step 242 is the driving order, then the driving order of the motor 8 is canceled at step 252, and only the power-generating order of the motor 8 is made effective by the drive-prohibiting control mode.

When the answer to the determination in step 250 is "0", then the result from previous step 242 is rendered operative. Then, the motor 8, by the drive/power generation-permitting control mode, is controlled at step 254 according to either the effective driving order or power-generating order. Thereafter, the routine is returned to previous step 240.

In this way, the motor control apparatus 34 is connected to the engine 2 mounted on a vehicle which connects the transmission 6 through the clutch 4, and connects the motor 8 having the drive function and the power generation function to the engine 2. And the motor control means 36 controls the drive mode and the power generation mode of the motor 8 having the drive function and the power generation function according to the operating mode of the engine 2 and the operating mode of the vehicle, becoming independent from a control of the engine 2 by the engine control means 32.

Further, the motor control apparatus 34 includes the idling power generating control mode, the starting drive control mode, the starting-up drive control mode and the idling rotational speed-stabilized drive control mode as the stopping control mode. And, the motor control apparatus 34 controls so as to charge the main battery 54 by generating electricity by the motor 8 in the idling power generating control mode, controls so as to assist in starting the vehicle by driving the motor 8 in the starting drive control mode, controls so as to assist in starting up the engine 2 by driving the motor 8 in the starting-up drive control mode, and controls so as to stabilize the idling rotational speed of the engine 2 by driving the motor 8 in the idling rotational speed-stabilized drive control mode.

In the motor control apparatus 34 of the vehicle, the motor control means 36 as shown in FIG. 9 includes: the vehicle velocity sensor 92; the engine rotational speed sensor 172; the first clutch switch 176 which switches to off when the clutch 4 is fully combined (engaged), and successively from the fully combined state, which switches to on just before the clutch 4 is placed in a half combination (partially engaged) state; and the second clutch switch 178 which becomes off when the clutch 4 is fully released and successively from the fully released state, which becomes on just before the clutch 4 is placed in a half combination (partially engaged) state.

In a region determining from a relation between a vehicle velocity Vs and an engine rotational speed Ne, the motor control means 36 sets following regions: a gear engaging region, "S1-S1'" to "Sn-Sn'" that either of each gearing gear (not shown) of transmission 6 is engaged; and a neutral region N that neither of each gearing gear is engaged. As shown in FIG. 2, in the embodiment, the following gear engaging regions in the five-grade system are set in a region determining from a relation between a vehicle velocity Vs and an engine rotational speed Ne: "S1-S1'":velocity-1; "S2-S2'":velocity-2; "S3-S3'":velocity-3; "S4-S4'";velocity-4 and "S5-S5'":velocity-5. The neutral region "N" is set besides "S1–S1'" to "Sn-Sn'".

The motor control means 36 judges the speed-1 to the speed-5 and the neutral that is a gear position, accordance as a judgment value S obtaining from a vehicle velocity Vs and an engine rotational speed Ne that is equivalent to the gear engaging region "S1-S1'" to "S5-S5'" and either region of the neutral region N.

The motor control means 36 sets up a neutral determining condition for determining whether the transmission 6 is in the neutral state, according to the judgment value S obtaining from a vehicle velocity Vs and an engine rotational speed Ne, and the "ON/OFF" of the first clutch switch SW1 (176) and the "ON/OFF" of the second clutch swith SW2 (178).

The neutral determining conditions are as follows:

1) A vehicle velocity Vs is zero (Vs=0 km/h), and an engine rotational speed Ne exceeds zero (Ne>0 rpm).

2) A vehicle velocity Vs exceeds zero (Vs>0 km/h), and the determining value S is in a neutral region N (either S<S1, S1'<S<S2, S2'<S<S3, S3'<S<S3, S3'<S<S4, S4'<S<S5 and S5'<S include).

3) A vehicle velocity Vs exceeds zero (Vs>0 km/h), and the second clutch switch 178 is off (accordingly, the first clutch switch 176 is "ON", i.e., a fully released state of the clutch).

4) A vehicle velocity Vs is zero (Vs=0 km/h), and the second clutch switch 178 is off (accordingly, the first clutch switch 176 is "ON", i.e., a fully released state of the clutch 4).

The motor control means 36 determines an approval of various control states of motor 8 by a determined result of these neutral determining conditions, and executes the control mode determined.

In the motor control apparatus 34 in the first embodiment, the motor control means 36 sets as a neutral determining condition for determining that the transmission 6 is in a neutral state, by considering both conditions of the above-mentioned condition 1) that a vehicle velocity Vs is zero (Vs=9 km/h), and that an engine rotational speed Ne exceeds zero (Ne<0 rpm), and the above-mentioned condition 4) that a vehicle speed Vs is zero (Vs=0 km/h), and that the second clutch switch 178 is off.

The motor control means 36 makes a determining condition for approving the above-mentioned idling power generating control mode, and when, among these neutral determining conditions, one is satisfied at least, then motor control means 36 determines as the approval of the idling power-generating control mode, and controls so as to generate electricity by motor 8.

Figure 1:
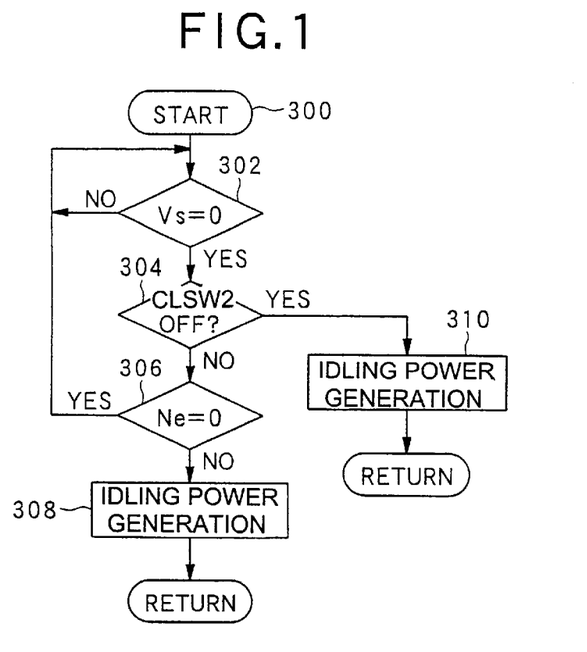
FIG. 1 is a control flowchart of a motor control apparatus showing a first embodiment according to the invention.

Next, an explanation will be given as to the operation of the first embodiment in reference to FIG. 1.

The motor control means 36 in the motor control apparatus 34 starts control at step 300, then a determination is made at step 302 as to whether the vehicle velocity Vs is zero (Vs=0).

When the determiniation in step 302 is "NO", then the determination in step 302 is repeated. When the determination in step 302 is "YES", then a determination is made at step 304 as to whether the second clutch switch 178 is "OFF" (accordingly, the first clutch switch is "ON").

When the determination in step 304 is "NO", then a determination is made at step 306 as to whether the engine rotational speed Ne is zero (Ne=0 rpm).

When the determination in step 306 is "YES", then the routine is returned to the determination in step 302. When the determination in step 306 is "NO", then motor control means 36 determines as the approval of the idling power-generating control mode, and controls so as to generate electricity by motor 8 (step 308), because the vehicle velocity Vs is zero (Vs=0 km/h and the engine rotational speed Ne exceeds zero (Ne>0 rpm) (region "A" shown by a slanted line in FIG. 2). And the routine is returned to the determination in previous step 302.

When the determination in step 304 is "YES", then motor control means 36 determines as the approval of the idling power-generating control mode, and controls so as to generate electricity by motor 8 (step 310), because the vehicle velocity Vs is zero (Vs=0 km/h) and the second clutch switch 178 is "OFF". And the routine is returned to the determination is previous step 302.

Thus, in the following two neutral determining conditions of the transmission 6 that the vehicle velocity Vs is zero (Vs=0 km/h) and the engine rotational speed Ne exceeds zero (Ne>0 rpm), and that the vehicle velocity Vs is zero (Vs=0 km/h) and the second clutch switch 178 is "OFF", when one of these two neutral determining conditions is satisfied at least, the motor control means 36 in the motor control apparatus 34 determines as the approval of the idling power-generating control mode, and controls so as to generate electricity by motor 8.

By this means, the motor control apparatus 34 can determine that a gear position of transmission 6 is neutral, without disposing a gear position sensor therein, and that the control mode of the motor 8 is in the idling power-generating control mode, by using the neutral determination of the transmission.

Therefore, the motor control apparatus 34 can control the motor 8 by determining an approval of the idling power-generating control mode by using the neutral determination of the transmission 6, without disposing a gear position sensor in the transmission. Accordingly, a structure of the control apparatus is simplified, and a false search of a gear position and an output of wrong trouble signal are avoided by not detecting mechanically a gear position of the transmission 6, and the reliability of the motor control is improved.

Figure 13:
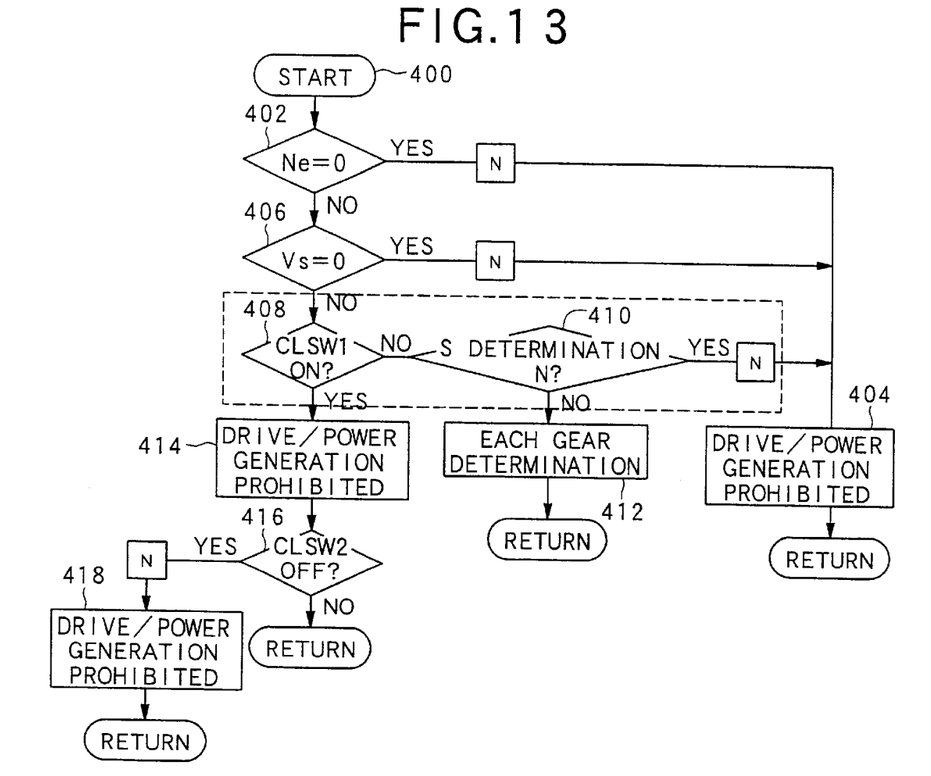
FIG. 13 is a control flowchart in a motor control apparatus showing a second embodiment according to the invention.
Figure 14:
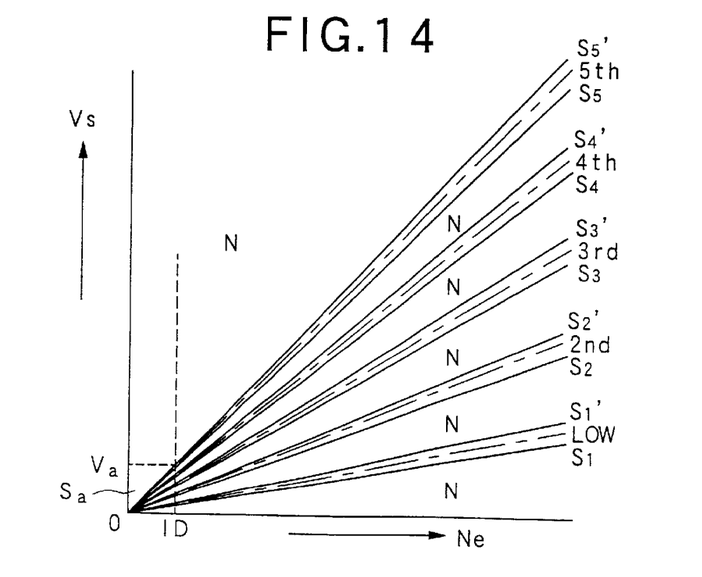
FIG. 14 is a diagram for explaining a region consisting of a vehicle velocity and an engine rotational speed.

FIGS. 13 and 14 show a second embodiment. The motor control apparatus 34 in the second embodiment, in the same manner as the above-mentioned first embodiment, includes the motor control means 36, the vehicle velocity sensor 92, the engine rotational speed sensor 172, the first clutch switch 176 and the second clutch switch 178.

The motor control means 36, as shown in FIG. 14, sets a gear engaging region, "S1-S1'" to "Sn–Sn'"; and a neutral region N, determining from a relation between a vehicle velocity Vs and an engine rotational speed Ne, and determines one among the "velocity-1" to the "velocity-5", or the "neutral" as the gear position, by the determring value S, obtained from a vehicle velocity Vs and an engine rotational speed Ne, that is determined one region among the "S1-S1'" to "S5–S5'" regions and the "neutral" region as the gear engaging regions.

The motor control means 36 sets a following neutral determining conditions by the determining value S obtained from the vehicle velocity Vs and the engine rotational speed Ne, and by the "ON/OFF" of the first clutch switch 176 and the "ON/OFF" of the second clutch switch 176.

1) A vehicle velocity Vs is zero (Vs=0 km/h), and an engine rotational speed Ne exceeds zero (Ne>0 rpm).

2) A vehicle velocity Vs exceeds a zero (Vs>0 km/h), and the determining value S is in a neutral region N (either S<S1, S1'<S<S2, S2'<S<Sd3, S3'<S<S4, S4'<S<S5 and S5'<S).

3) A vehicle velocity Vs exceeds zero (Vs>0 km/h), and the second clutch switch 178 is off (accordingly, the first clutch switch 176 is "ON") (a fully released state of the clutch).

4) A vehicle velocity Vs is zero (Vs=0 km/h), and the second clutch switch 178 is off (accordingly, the first clutch switch 176 is "ON") (a fully released state of the clutch 4).

The motor control means 36 determines an approval of various control state of motor 8 by a determined result of these neutral determining conditions, and executes the control mode determined.

In the motor control apparatus 34 in the second embodiment, the motor control means 36 sets a following neutral determining conditions for determining that the transmission 6 is in a neutral state: both conditions of the above-mentioned condition 2) that a vehicle velocity Vs exceeds zero (Vs>0 km/h) and an determining value is in the neutral region N, and the above-mentioned condition 3) that a vehicle velocity Vs exceeds zero (Vs>0 km/h) and the second clutch switch 178 is off.

The motor control means 36 makes a determining condition for approving the above-mentioned drive/power generation-prohibiting control mode, and when, among these neutral determining conditions, at least one is satisfied, then motor control means 36 determines as the approval of the drive/power generation-prohibiting control mode, and controls so as to prohibit the drive/power generation of the motor 8.

Next, an explanation will be given the operation of the second embodiment in reference to FIG. 13.

When the motor control means 36 in the motor control apparatus 34 starts control at step 400, then a determination is made at step 402 as to whether the engine rotational speed Ne is zero (Ne=0).

When the determination in step 402 is "YES", then the motor control means 36 controls so as to prohibit the drive/power generation of the motor 8 because of "neutral" (step 404), and the routine is returned to the determination in step 402. When the determination in step 402 is "NO", then a determination is made at step 406 as to whether the vehicle velocity Vs is zero (Vs=0).

When the determination in step 406 is "YES", then the motor control means 36 controls so as to prohibit the drive/power generation of the motor 8 because of "neutral" (step 404), and the routine is returned to the determination in step 402. When the determination in step 406 is "NO", then a determination is made at step 408 as to whether the first clutch switch 176 is "ON".

When the determination in step 408 is "NO", then a determination is made at step 410 as to whether a determining value S is in the neutral region "N". When the determination in step 410 is "YES", then the motor control means 36 controls so as to prohibit the drive/power generation of the motor 8 (step 404) because of the "neutral" state in an inertia traveling mode (the clutch is fully combined state) releasing the gear in traveling, and the routine is returned to the determination in step 402.

When the determination in step 408 is "NO", then a determination is made at step 412 as to which gear engaging region is among "S1-S1'":velocity-1, "S2-S2'": velocity-2, "S3-S3'":velocity -3, "S4-S4'":velocity-4, and "S5-S5'":velocity-5, and the routine is returned to the determination in step 402. In the determination of the gear engaging region, the gear engaging region determined just before renewed is maintained until the data is determined as other gear engaging region and is renewed in the determination in later step 410.

When the determination in step 414 is "YES", then the motor control means 36 controls so as to prohibit the drive/power generation of the motor 8 (step 414) because of an inertia traveling mode (the half clutch state) being to let the gear release at gearing process in traveling. Accordingly, a determination is made at step 416 as to whether the second clutch switch 178 is off.

When the determination in step 416 is "NO", then the routine is returned to the determination in step 402. When the determination in step 416 is "YES", the motor control means 36 determines as "neutral" and controls so as to prohibit the drive/power generation of the motor 8 (step 418) because of an inertia traveling mode (the released clutch state) releasing the gear at gearing process in traveling. And the routine is returned to the determination in step 402.

Thus, in the following two neutral determining conditions of the transmission 6 that the vehicle velocity Vs exceeds zero (Vs>0 km/h) and a determining value is in the neutral region N, and that a vehicle speed Vs exceed zero (Vs>0 km/h) and the second clutch switch 178 is off, when at least one of these two neutral determining conditions is satisfied, the motor control means 36 in the motor control apparatus 34 determines as the approval of the drive/power-generation prohibiting control mode, and controls so as to prohibit the drive/power-generation of motor 8.

By this means, the motor control apparatus 34 can determine that a gear position of transmission 6 is neutral, without disposing a gear position sensor therein, and that the control mode of the motor 8 is the drive/power-generation prohibiting control mode, by using the neutral determination of the transmission.

Therefore, the motor control apparatus 34 can control the motor 8 by determining an approval of the drive/power-generation prohibiting control mode by using the neutral determination of the transmission 6, without disposing a gear position sensor therein. Accordingly, the structure of the control apparatus is simplified, and a false search of a gear position and output of a wrong trouble signal are avoided, and the reliability of the motor control is improved.

Incidentally, in FIGS. 2 and 14, when a determining value "S" is "Sa" in a region that an engine rotational speed "Ne" is less than an idle rotational speed "ID" and a vehicle velocity "Sa" is less than a determined vehicle speed "Va", it is presumed that the determining value "S" enters one of the domains of "S1-S1'", "S2-S2'", "S3-S3'", "S4-S4'" and "S5-S5'", being in a gear engaging region, and the probability is high. But, the motor driving control being a certain region is canceled by a signal of the brake switch 96, the first clutch switch 176 and the second clutch switch 178 in an operation of a brake (not shown) and a clutch 4. In addition, in above-mentioned region "Sa", the drive/power-generation of motor 8 is prohibited.

Futhermore, this invention is not limited to the above-mentioned embodiments, but is suitable to many possible innovations and applications. For example, in the stopping control mode, when the idle running time has exceeded a determined time since a neutral condition of transmission 6 has been approved, the motor control means 36 controls so as to drive motor 8 while decreasing fuel, as a result, a fuel efficiency is reduced while letting the idling rotational speed stable by an engine rotational speed, and a discharge of detrimental components in exhaust gases is reduced.

Moreover, in a traveling control mode, when a change completion time until a gearing step is changed to the next gearing step after a neutral condition was approved, has exceeded a determined time in gearing operation of transmission 6, then the motor control means 36 controls so as to drive the motor 8. Accordingly, a fall of an engine rotational speed in gearing is prevented, and in the clutch 4 the engaging shock is reduced when combined just after a gearing step has changed to the next gearing step.

Futhermore, in the above-mentioned embodiment, the motor control apparatus 34 controls so as to assist an engine 2 as a leading power source by motor 8. And also, this apparatus can control an engine and a motor as equality as driving power source, by this means, controlling so as to selectively use either with engine 2 and motor 8 as the drive power source in order to show a drive performance in a maximum, in consideration of fuel efficiency and value of detrimental components in exhaust gases of engine 2 and a charge state of main battery 54.

Thus, without using a gear position sensor, the motor control apparatus for the vehicle in the present invention can determine that a gear position of a transmission is neutral, by a vehicle velocity, an engine rotational speed and a second clutch switch. And the motor control apparatus can determine the motor control state using the neutral determination of the transmission.

Thereby, the motor control apparatus can control the motor by determining an approval of the various motor control states using the neutral determination of the transmission, without disposing a gear position sensor therein. As a result, a structure of the control apparatus is simplified, and a false search of a gear position and an output of a wrong trouble signal is avoided by not mechanically detecting a gear position of the transmission, and the reliability of the motor control is improved.

Although a particular preferred embodiment of the invention has benn disclosed in detail for illustrative purposes, it will be recognized that variations or modifications of the disclosed apparatus, including the rearrangement of parts, lie within the scope of the present invention.

What is claimed is:

1. A motor control apparatus for a vehicle having and engine which is connected to a transmission through a clutch, and which is connected to a motor having both driving and power-generating functions, and controlling both driving and power-generating states of the motor based on a traveling state of the vehicle and a running state of the engine, comprising: a vehicle velocity sensor for detecting a vehicle velocity of the vehicle; an engine rotational speed sensor for detecting an engine rotational speed of the engine; a first clutch switch which becomes off when the clutch is fully engaged, and successively from the fully engaged state becomes on when the clutch is moved toward a partially engaged state; a second clutch switch which becomes off when the clutch is fully released, and successively from the fully released state becomes on when the clutch is moved toward a partially engaged state; and a motor control means for controlling so as to generate electricity by the motor, determining as the approval of an idling power-generating control state, when at least one of the following two neutral determining conditions, which are set to determine that the transmission is neutral, is satisfied: the condition that a vehicle velocity is zero and an engine rotational speed exceeds zero, and the condition that a vehicle velocity is zero and the second clutch switch is off.

2. A motor control apparatus for a vehicle having an engine which connects a transmission through a clutch, and which is connected to a motor having both driving and power-generating functions, and controlling both driving and power-generating states of the motor based on a traveling state of the vehicle and a running state of the engine, comprising: a vehicle velocity sensor for detecting a vehicle velocity of the vehicle; and engine rotational speed sensor for detecting an engine rotational speed of the engine; a first clutch switch which becomes off when the clutch is fully engaged, and successively from the fully engaged state becomes on when the clutch is moved toward a partially engaged state; a second clutch switch which becomes off when the clutch is fully released, and successively from the fully released state, becomes on when the clutch is moved toward a partially engaged state; and a motor control means setting a following two regions: a gear engaging region wherein a gearing gear of the transmission is engaged, and a neutral region wherein no gearing gear is engaged; thereby the motor control means for controlling so as to prohibit a drive/power-generation of the motor, determining as the approval of a drive/power-generation prohibiting control state, when at least one of the following two neutral determining conditions, which are set to determine that the transmission is neutral, is satisfied: the condition that a vehicle velocity exceeds zero and a determining value obtained from a relation between a vehicle velocity and an engine rotational speed is in the neutral; and the condition that a vehicle velocity exceeds zero and the second clutch switch is off.

* * * * *